United States Patent [19]
Young

[11] 3,896,432
[45] July 22, 1975

[54] PERSPECTIVE RADAR AIRPORT RECOGNITION AND LANDING GUIDANCE SYSTEM

[76] Inventor: David W. Young, 627 N. Beachwood Ave., North Hollywood, Calif. 91506

[22] Filed: Aug. 3, 1973

[21] Appl. No.: 385,534

Related U.S. Application Data

[63] Continuation-in-part of Ser. No. 847,121, Aug. 4, 1969, Pat. No. 3,778,821.

[52] U.S. Cl......... 343/5 LS; 343/5 EM; 343/5 MM; 343/7.9; 343/17; 343/108 SM
[51] Int. Cl.² .......................... G01S 7/20; G01S 7/22
[58] Field of Search.........343/5 EM, 5 MM, 6 TV,
343/108 SM, 108 R, 7 TA, 17,
343/5 LS, 7.9

[56] References Cited
UNITED STATES PATENTS

| | | | |
|---|---|---|---|
| 3,324,471 | 6/1967 | Rouer, Jr. ...................... | 343/108 R |
| 3,355,733 | 11/1967 | Mitchell et al.................... | 343/5 EM |
| 3,438,600 | 4/1969 | Jakab ............................ | 343/108 SM |
| 3,472,469 | 10/1969 | Evans et al. ..................... | 343/5 MM |
| 3,555,179 | 1/1971 | Rubin ............................. | 343/5 MM |
| 3,643,258 | 2/1972 | Balding............................ | 343/5 EM |
| 3,716,866 | 2/1973 | Mason.............................. | 343/5 LS |

*Primary Examiner*—Maynard R. Wilbur
*Assistant Examiner*—Montone, G. E.
*Attorney, Agent, or Firm*—Ralph B. Pastoriza

[57] ABSTRACT

A self-contained perspective radar system is modified and improved by providing an additional display on the radar screen in accordance with known information such as the range and bearing of the aircraft at a given fix point during an approach and landing operation. The additional display may take the form of a vertical vector generated on the display screen the upper terminal point of which indicates the location of the threshold of the airport runway and the overall length of which decreases with decreasing range as the aircraft approaches the runway. The horizontal position of this vector will also indicate any deviation in heading. In a more advanced embodiment, the additional display may actually constitute a generated runway outline for comparison with the actual runway detected by the perspective radar. In its most sophisticated form, in addition to other features, an actual image containing all known information of the physical characteristics of an airport complex is stored rather than displayed in a condition such that it may be compared with the perspective radar display by a suitable comparing means which provides output signals such as error signals to advise the pilot of a mismatching of the actual perspective radar picture with the stored image. The same output signals may be used to automatically control an auto-pilot so that approach and landing of the aircraft can be effected completely automatically without the necessity of any pilot intervention and by a system which is wholly self-contained within the aircraft.

10 Claims, 8 Drawing Figures

PERSPECTIVE RADAR AIRPORT RECOGNITION AND LANDING GUIDANCE SYSTEM

This application is a continuation-in-part of my copending patent application Ser. No. 847,121 filed Aug. 4, 1969 and entitled AIRCRAFT CONTAINED PERSPECTIVE RADAR/DISPLAY AND GUIDANCE FOR APPROACH AND LANDING, now U.S. Pat. No. 3,778,821 issued Dec. 11, 1973.

This invention relates to improved perspective radar systems wholly contained within an aircraft to aid a pilot in airport recognition and to enable precision guidance during approach and landing of the aircraft.

BACKGROUND OF THE INVENTION

Landing systems for aircraft may be generally divided into two types: non-precision and precision. Certain minimum weather conditions must exist in order to use any landing system so that the pilot can effect a visual landing after completion of an instrument approach. Typical of the first system is the variable omni range or VOR which functions to provide a radio fix for an aircraft from which point an approach and landing is made. Equivalent non-precision systems utilize ADF, radar surveillance and R-Nav. Minimum weather conditions permitting use of such systems must be such that the pilot can "see to land" at an altitude of from 500 to 700 feet above ground. Many thousands of airports in the country are provided with VOR.

The second or precision landing is typified by instrument landing systems or ILS. In these systems, a radio beam is directed from the ground to define a proper glide path and the pilot can track this glide path down to a safe landing. An azimuth guidance called the localizer is also provided which works similarly to a VOR located on the airport.

The minimum weather requirements for precision or instrument landing systems are defined by various categories. For example, there are only a few hundred airports which provide instrument landing systems in a first category referred to as Cat. I. These minimums require that the pilot can see to land at an altitude no less than 200 feet and an RVR (Runway Visual Range) of 2600 feet. A second category of minimums referred to as Cat. II which is only available at about ten airports in the country permits landings to take place only if the pilot can see to land at an altitude no less than 100 feet and an RVR of 1200 feet. A third category referred to as Cat. III, provides for even lower minimum, but these minimums are not yet in operation.

From the forgoing it will be appreciated that precision landing systems in present operations require information from the ground; that is, some type of ground based instrumentation to aid a pilot in effecting a proper landing in conditions of bad weather.

Since there are many thousands of airports equipped with VOR, it would present an enormous advance in the art if a system could be provided which permitted precision landings to take place at such airports the same as though there were an ILS system available but which did not require the special instrumentation now required in the airport complex.

The advent of perspective radar wholly self-contained in an aircraft has gone a long way towards achieving the above goal. Such a perspective radar system is fully described and shown in my co-pending patent application Ser. No. 847,121 filed Aug. 4, 1969 and entitled AIRCRAFT CONTAINED PERSPECTIVE RADAR/DISPLAY AND GUIDANCE FOR APPROACH AND LANDING, now U.S. Pat. No. 3,778,821 issued Dec. 11, 1973. Further reference is made to my additional co-pending patent applications identified as follows:

| Title | Serial No. | Filing Date |
| --- | --- | --- |
| RIDGE SCAN ANTENNA | 353,201 | 4-20-73 now U.S. Pat. No. 3,829,862 issued Aug. 13, 1974. |
| CONTINUOUS SCANNING WAVEGUIDE ANTENNA | 353,129 | 4-20-73 now U.S. Pat. No. 3,803,620 |
| FLAP ANTENNA | 355,065 | 4-27-73 now U.S. Pat. No. 3,868,693 |
| SHADOW ANTENNA | 355,019 | 4-27-73 now U.S. Pat. No. 3,855,591 |

The first three of the above mentioned additional applications relate particularly to improvements in antenna construction and location for providing a proper scanning beam to improve the quality of the perspective radar display. The last co-pending application entitled SHADOW ANTENNA discloses a means utilizing perspective radar which will aid a pilot in guiding his aircraft during an approach and landing.

Essentially, the use of perspective radar has enabled for the first time precision approaches and landings to be efffected by an aircraft pilot. However, there can still be encountered some difficulties in recognizing an airport runway and further in assuring that a proper glide path is being maintained.

BRIEF DESCRIPTION OF THE PRESENT INVENTION

With the foregoing considerations and background information in mind, the present invention contemplates in combination with a perspective radar system a guidance control means incorporating known information relative to an airport complex including the range and heading of the aircraft to the airport runway from a given fix point of the aircraft for comparisons with the perspective display provided by the perspective radar.

The range and proper heading to an airport are provided by navigation charts at various fix points along the route of the aircraft. These parameters at the final fix of the aircraft position as provided by standard FAA Air Traffic Control such as VOR, are utilized to orient an additional display generated in the aircraft. Once the orientation is established, such ground signal is no longer utilized. The generated display in the aircraft is then superimposed oh the perspective radar display so that the pilot may make a comparison and thereby identify the airport on the display screen. Thereafter a landing is effected independently of any guidance signals from the airport or other ground areas.

In essence, the present invention reduces the required minimums for non-precision or VOR landings to the minimums for precision or ILS landings without the necessity of the normal ground equipment provided by ILS.

In a first embodiment, a vertical vector line is generated on the display screen which indicates the location on the screen of the threshold of the runway at the final fix point and will also serve to indicate any bearing errors.

In a second more sophisticated embodiment, a runway outline generating means is provided which actually produces for comparison on the perspective radar screen an outline of the airport runway in accord with known information and as it would appear at the final fix point. By comparing this generated runway outline with the actual runway outline displayed by the perspective radar, the pilot can again effect a proper landing.

A third embodiment contemplates an image storing means of the airport complex which stored image may be compared with the image provided by the perspective radar and suitable output signals generated indicating either proper matching or mismatching of the stored image with the actual image. These signals can be used to aid the pilot in guiding the aircraft or alternatively, can actually be fed into the automatic pilot so that a fully automatic landing of the aircraft can take place.

BRIEF DESCRIPTIONS OF THE DRAWINGS

A better understanding of the invention will be had by now referring to the accompanying drawings in which:

FIG. 11 is a perspective view of an airport complex showing an aircraft at a final fix point approaching the airport runway for a landing;

DETAILED DESCRIPTION OF THE INVENTION

Figure 1:
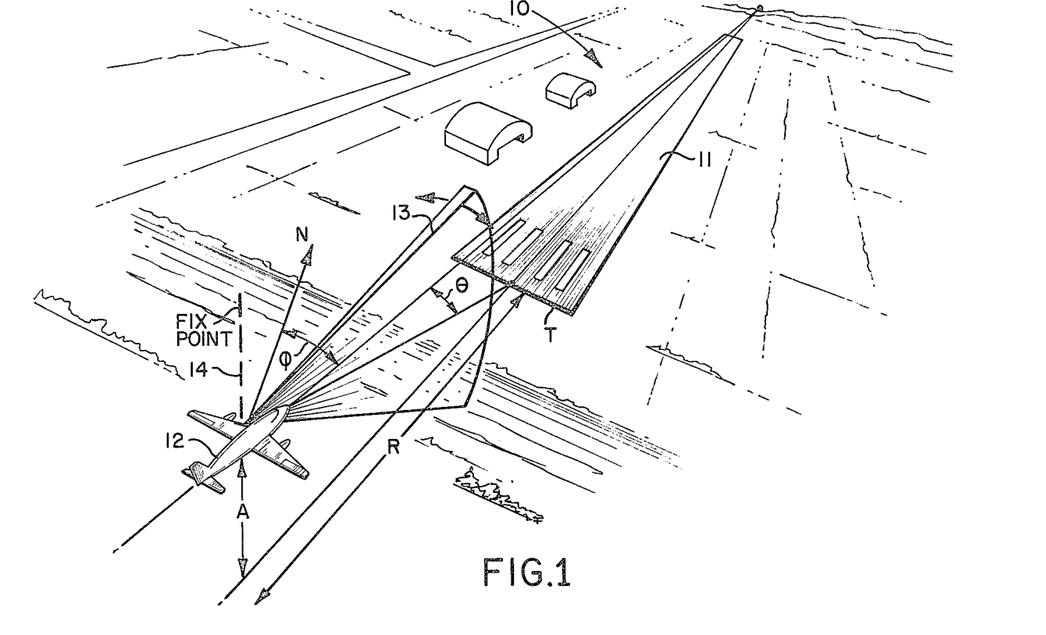

Referring first to FIG. 1 there is designated generally by the numeral 10 an airport complex including an airport runway 11. An aircraft 12 is shown approaching the runway threshold T along a glide path of angle $\theta$. The aircraft itself is equipped with a perspective radar system which generates a beam 13 fan shaped in a vertical plane and arranged to scan back and forth horizontally as indicated by the double headed arrow. The fan shaped scanning radar beam 13 may be generated by a suitable ridge scan antenna such as described in my heretofore mentioned co-pending patent application Ser. No. 353,201.

As indicated in FIG. 1, the aircraft 12 is located at a final fix point 14 wherein the range R and the bearing angle or heading $\phi$ to the runway 11 are precisely known. The altitude A of the aircraft above the airport runway surface is also known to the pilot at the fix point 14 from his altimeter reading.

Figure 2:
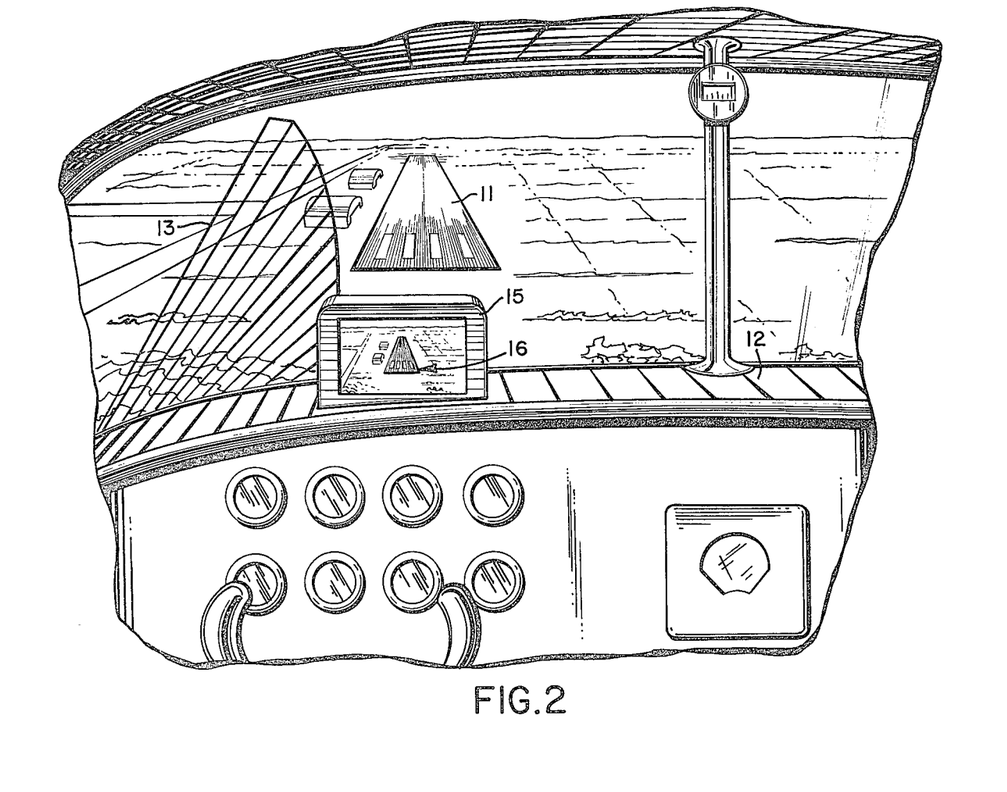
FIG. 2 is a view looking out at the airport complex from the interior cockpit of the aircraft of FIG. 1.

Referring to FIG. 2, there is shown a cathode ray display screen 15 upon which the perspective radar signals are displayed as at 16.

Normally there is considerable industrial congestion around most airports in the form of buildings, freeway intersections, and the like. These structures as well as the surrounding terrain in front of the aircraft provide good radar reflection for the display, the airport runway 11 itself generally being indicated by a black area. However, it is not always easy for a pilot to quickly detect that area of the screen where the runway is actually located and as started, one of the principal purposes of the present invention is to aid the pilot with such airport runway recognition and further aid the pilot in guiding the aircraft to a proper landing on the runway.

It will be understood that the perspective radar utilizes a special antenna to provide the vertical fan shape and a suitable antenna drive system to effect the scanning of the fan shaped beam back and forth in azimuth. The display 16 which is in perspective will be very similar to a television picture of the airport complex it being understood, however, that the displayed picture will only change with changes in the altitude or elevation of the aircraft or changes in its's bearing. Any small change in the pitch or attitude of the aircraft will not affect the display 16 because of the relatively wide vertical angle of the fan shaped beam. The situation is thus analogous to a television display wherein the television camera is mounted on a gimbal on the nose of the aircraft so as to always be oriented at the same pitch regardless of changes in pitch of the aircraft.

Figure 3:
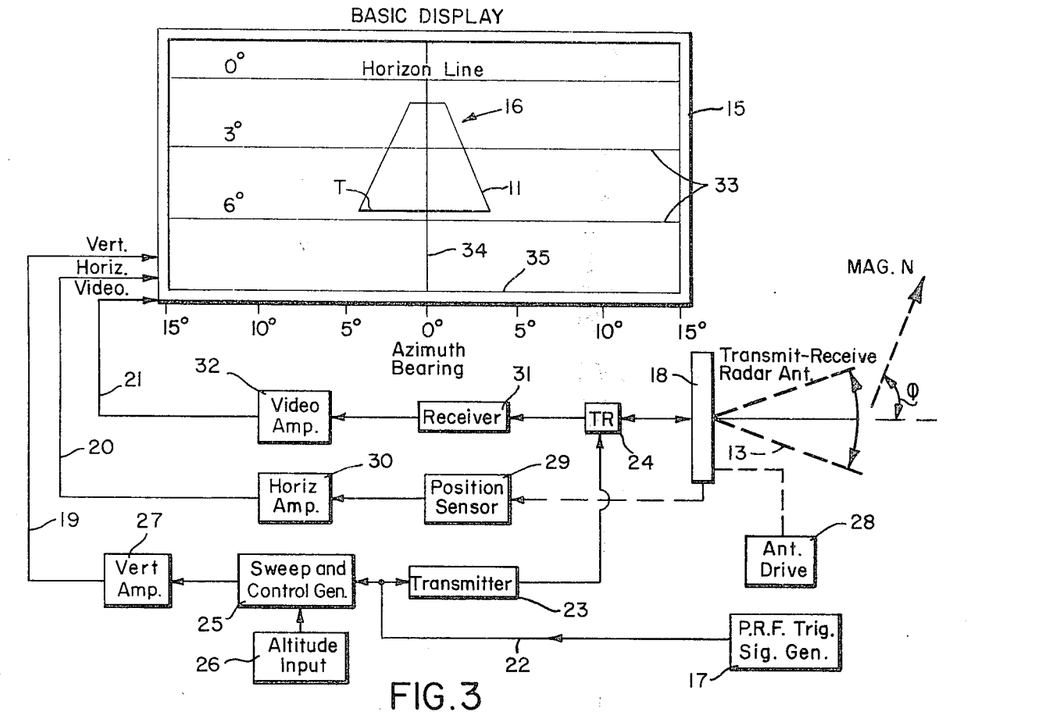
FIG. 3 illustrates a basic display of a perspective radar system together with major components of the system incorporated in the aircraft of FIG. 1.

Referring now to FIG. 3, the basic components of the perspective radar system are shown in block form. A more complete description is fully set forth in my heretofore referred to co-pending application Ser. No. 847,121.

Referring first to the lower right hand portion of FIG. 3, the radar system includes a PRF synchronizing trigger signal generator 17. an antenna means which may be in the form of a wave guide antenna 18, and vertical, horizontal, and video input lines 19, 20 and 21 connecting to the cathode ray display tube 15.

The PRF (pulse repetition frequency) trigger signal generator 17 provides synchronizing trigger signals along an output line 22 to a radar transmitter 23 connecting to the antenna 18 through the usual TR switch 24. The same synchronizing trigger signal on line 22 passes to a vertical sweep generator 25 which includes a suitable sweep control to convert the sweep from linear to non-linear and thereby provide the desired perspective display. Since the perspective display depends on the altitude of the aircraft the sweep generator is also controlled by an altitude input 26. The sweep signal generator connects to a vertical amplifier 27 to the vertical input line 19 of the display 15.

Horizontal movement of the sweeping cathode ray beam to effect a desired raster pattern is synchronized to an antenna drive indicated at 28 adjacent to the trigger signal generator 17. Essentially the antenna drive shifts the angular position of the fan shaped beam 13 in azimuth so that the fan shaped beam sweeps back and forth at, for example, forty times per second. The position of the antenna beam in azimuth is detected by a position sensor 29 which passes a suitable control signal through a horizontal amplifier 30 to the horizontal input 20 of the display 15 so that the horizontal position of the vertically sweeping beam corresponds to the azimuth angle of the fan shaped radiated beam 13.

The reflected radar signals are received by the antenna 18 and passed through the TR switch 24 to a receiver 31. These signals are then passed through a video amplifier 32 to the video input line 21 of the display 15.

Assuming that the edges of the runway 11 are fairly well defined, there will be reproduced in perspective an image of the runway as shown in the display 16 of FIG. 3. The non-linear vertical scanning is such that the vertically moving beam throughout a single sweep is traveling rapidly at the lower portion of the display and slower at the upper portion to produce the desired perspective presentation.

Thus, at the beginning of each vertical sweep, the fan shaped radiant energy beam is transmitted from the antenna and echos or reflected radiation of the beam from objects in the airport complex will be received at different times depending on the range, these echo signals constituting the video signals and serving to generate bright spots at various vertical points of the sweeping cathode ray beam. Increasing range or distance to the targets or objects from which echos are received is thus measured in the vertical sweep direction, the azimuth location or bearing being indicated by horizontal positions.

Since the vertical distance on the display screen between two points represents a greater range at the top portion of the screen near the end of the vertical sweep than at the lower portion near the beginning of the sweep in a perspective view, the heretofore described variation in the sweep speed from fast to slow is necessary to provide the perspective display.

In accord with a first feature of the present invention, the display screen 15 of FIG. 3 is provided with reticles 33 defining horizontal spaced lines indicating in degrees glide slopes that can be followed by the aircraft. In addition, there is defined by a single vertical reticle line bisecting the screen as shown at 34. A bearing scale 35 in degrees extends to the right and left of the vertical line 34 and serves to indicate bearing deviations.

Figure 4:
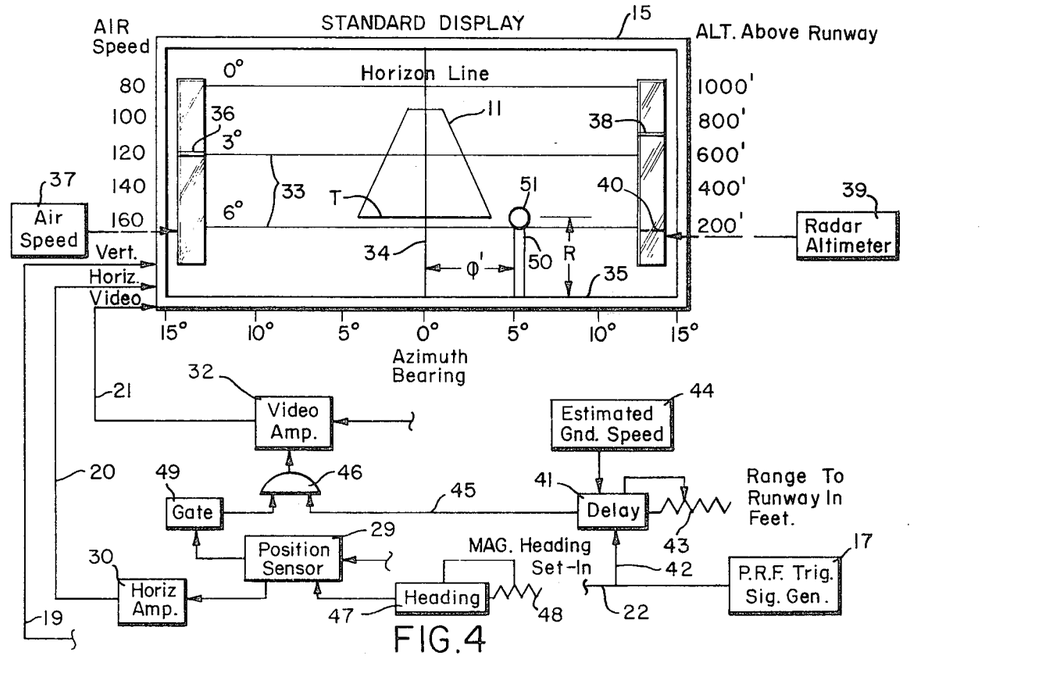
FIG. 4 is a view similar to FIG. 3 illustrating certain modifications and additions to the basic display of FIG. 3 to aid the pilot in locating the airport runway and properly guiding the aircraft.

Referring now to FIG. 4 there is shown the basic display of FIG. 3 with certain modifications and improvements in accord with further features of the present invention. In FIG. 4 the basic radar system components shown in blocks in FIG. 3 have not been reproduced to avoid cluttering the drawing. Rather, there are only shown in FIG. 4 additional blocks designating various circuits which cooperate with some of the blocks of FIG. 3 to provide an additional display on the screen useful as a guidance control.

Referring now in detail to FIG. 4, the display screen 15 is provided at it's left marginal portion with a bar type indicator 36 cooperating with an air speed scale to indicate the aircraft air speed as provided by a suitable air speed indicator 37. Similarly, the right side of the display 15 includes a bar indicator 38 coupled to a radar altimeter 39 for the aircraft to provide an easily readable display of the altitude of the aircraft above the runway in feet. A feature of the indicator 38 is the fact that when the bar reaches a low critical altitude of 200 feet which for example would be the minimum descent altitude for the particular circumstances involved, a strobing of the indicator bar in the form of a flashing light or any other suitable warning indicator system takes place. The critical altitude is indicated by the dashed line 40 for the indicator bar 38 in FIG. 4.

In order to aid the pilot in locating the airport runway on the display, the version of the guidance control means in the embodiment of FIG. 4 includes first means and control means providing first output signals to the video input of the display and second means and control means providing second output signals for controlling the horizontal position of first output signals on the screen thereby establishing an additional display.

More specifically, the first means and control means includes a delay circuit indicated at 41 receiving through line 42 the synchronizing trigger signal from the trigger signal generator 17. A potentiometer 43 permits setting in a given delay in circuit 41 corresponding to the range of the runway in feet from the final fix point of the aircraft. In addition, a circuit 44 controls the delay in accord with the estimated ground speed.

The output of the delay circuit 41 passes along lead 45 to the first input of a coincidence circuit 46 connecting to the video amplifier 32 and thence to the video input line 21.

A second input to the coincidence circuit 46 is in the form of a gate signal constituting a second signal means with appropriate control means. This second signal means includes a heading input circuit 47 in which the magnetic heading of the aircraft at the final fix point may be set in as by a potentiometer 48. The output of the heading circuit 47 serves to gate a suitable signal from the position sensor 29 whenever the antenna beam passes in azimuth through the magnetic heading direction, this signal passing through the gate circuit 49 providing the input gate signal to the coincidence circuit 46.

The resulting additional signals provided on the video input 21 in addition to the normal perspective radar signals from the antenna result in the generation of a vertical vector line 50 having a defined termination point 51 at it's upper end which corresponds to the position of the threshold T of the runway 11.

As indicated on the display 15, the length of the vector line 50 is indicated R and corresponds to the range to the runway threshold. The horizontal position of the vertical vector line 50 in turn indicates any bearing deviation there being shown by way of example a bearing deviation of $\phi'$ degrees, the actual degrees of deviation being readable on the scale 35.

The generation of the vector line 50 and the manner in which the same is used in aiding the pilot to guide the aircraft will now be described.

Referring once again to the delay circuit 41, as stated the range to the runway in feet at the final fix of the aircraft is known by the navigation chart and the pilot simply sets this range into the delay circuit 41. At the same time, knowing the estimated ground speed, the pilot starts the circuit 44 feeding into the delay circuit 41 to decrease the delay as the aircraft approaches the runway. The delayed pulse on the line 45 may take the form of an elongated square wave which decreases in width with decreasing delay such as might be generated by a one shot multi-vibrator and will result in the vertical vector line R on the vertical sweep on the display 15.

Except for the provision of the gate signal from the gating circuit 49 passing into the coincident circuit 46, the entire lower portion of the screen would be brightened by the line 50. However, the particular selected sweep on which the line appears as stated depends upon the azimuth position signal from the gate 49 which opens the coincident circuit 46 only at the point in time that the fan shaped beam is at the set-in heading.

There thus appears the vector 50 which terminates at the threshold T of the runway and normally this vector would be precisely in the center of the display. The vector being shown to one side to indicate a bearing error.

Under the above described circumstances, the pilot would maneuver the aircraft to the right slightly thereby bringing the vector line 50 in a position coincident with the vertical retical 34.

As stated, if the aircraft remains on the correct glide path, the vector line 50 will shorten as the aircraft approaches the runway threshold so that the terminal portion 51 of the line should correspond with the threshold of the runway on the basis of the "dead reckoning" information supplied in generating the vector.

Primarily, however the vector 50 aids the pilot in physically locating the visual display of the runway on the radar screen 15, the pilot knowing that the threshold of the runway should always correspond to the terminal point of the vector 50 at the final fix position of the aircraft. Once the pilot has located the runway in his perspective radar, he can then follow in using the perspective radar picture.

It will thus be seen that a unique recognition means is provided for the pilot at the final fix in combination with the convenient displays of the air speed and altitude to runway indications as provided by the bar indicators 36 and 38 respectively.

Figure 5:
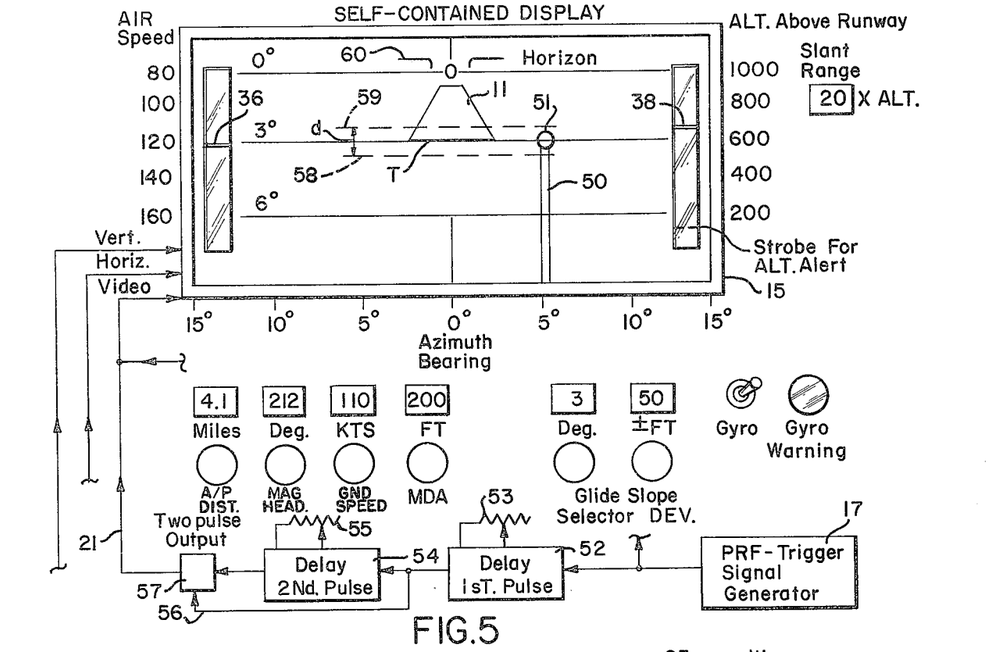
FIG. 5 is a view similar to FIG. 4 showing still further modifications and additions to the display.

Referring now to FIG. 5 there are illustrated additional circuits and features which may be provided on the display over those already described with respect to FIG. 4. Again, in FIG. 5, component blocks heretofore described have been omitted and only the added circuit structures shown.

Thus in FIG. 5 there is included the air speed and altitude above runway indication as well as the vector 50 all as described in conjunction with FIG. 4. The additional circuitry includes first and second pulse generators in the form of delay circuits responsive to trigger pulses from the trigger signal generator 17. The first pulse delay circuit is indicated at 52 and is provided with a potentiometer 53 so that a desired delay may be set into the circuit. The second delay circuit 54 receives the delayed signal from circuit 52 and effects a further delay as by a potentiometer 55 which may be manually set in. A by-pass line 56 picks off the first delayed pulse and combines it with the second delayed pulse at 57 to provide a two pulse output signal on the line 21 to the video input of the display 15. The vertical sweep is thus brightened at two spaced points and the result will be the generation of a pair of spaced parallel horizontal lines as indicated on the display screen 15 by the dash lines 58 and 59. The vertical level of these lines on the display screen 15 depends, of course, on the delays introduced to the super-imposed video signals and the interval or seperation distance d between the lines represents a given distance in elevation of the aircraft.

The provision of these two horizontal lines enables a pilot to position them to straddle a selected glide slope line such as the 3 degree line indicated in FIG. 5. Thus in guiding the aircraft towards the threshold T of the runway, should the aircraft change in elevation as a consequence of throttling down too much or not throttling down enough, the threshold T on the perspective radar will separate; that is, move up or down relative to the glide slope line of 3°. The pilot can estimate the elevational deviation by observing the position of the threshold line T relative to the horizontal lines 58 and 59.

For a 3° glide slope, the seperation distance of the lines 58 and 59 is 100 feet so that there is indicated a + or −50 foot deviation.

The foregoing information may be depicted by suitable instruments shown below the display 15 and labeled "glide slope selector deviation".

In addition to the above indications, further instruments may indicate the airport distance in miles, the magnetic heading in degrees, the ground speed in knots, and the minimum descent altitude in feet. Specific examples are written into the indicators of FIG. 5.

A further added feature to the self-contained display of FIG. 5 is a slant range indicator shown in the upper right corner of FIG. 5 which provides a numerical value such as 20 for a given glide slope. By multiplying the above runway altitude as indicated by the bar indicator 38 by the numeral 20 the slant range to the airport runway threshold is given.

As a further example of the operation of the various indicators of FIG. 5, if the pilot selected a 6° glide slope, straddling of the 6° glide slope line by the horizontal lines 58 and 59 would indicate a deviation of plus or minus 100 feet rather than 50 feet and the slant range multiple would be 10 rather than 20.

Pitch and roll information from a gyro input may be provided relative to the glide slope horizontal lines and the azimuth bearing vertical line such as incorporated in the perspective display described in my before mentioned co-pending application. Finally, an aircraft image similar to a standard gyro horizon with trim knob to set the attitude relative to the horizon line may be included such as indicated at 60. The display and control system of FIG. 5 is completed by a gyro on-off switch and gyro warning light as shown.

It should be borne in mind with respect to the systems as described that all approaches commence from the final approach fix point which is determined by onboard navigation equipment. In other words, the pilot of the aircraft knows precisely his location in terms of range and heading to the airport runway at the final fix point and it is this information which is set in to the additional circuits to generate the various additional displays described in FIGS. 4 and 5 to aid the pilot in locating the runway on the perspective display so that he can then land.

Figure 6:
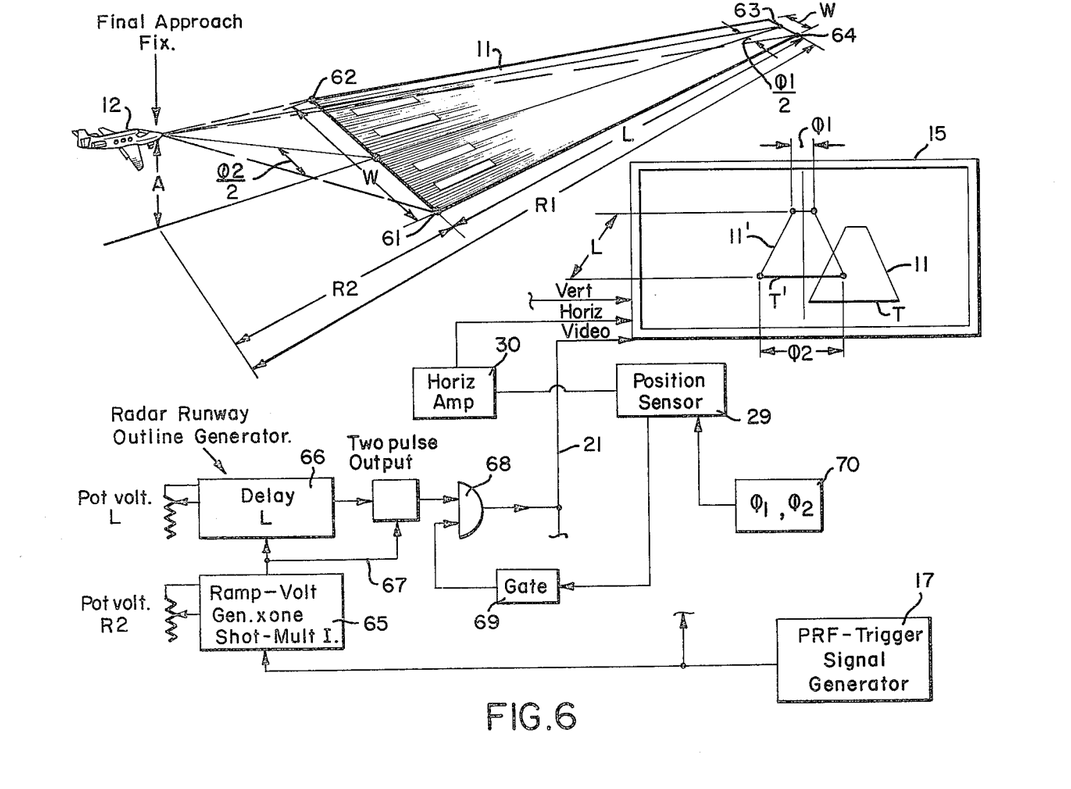
FIG. 6 is a diagrammatic view of a runway together with a radar runway outline generating means providing signals to the perspective radar display.

Referring now to FIG. 6, a guidance control means in combination with the perspective radar takes the form of a radar runway outline generator for providing the referred to additional display. This particular addition to the perspective display would be in place of the vector line generating system described in FIG. 4. In essence, rather than generating a simple vertical vector line, a complete outline of the runway is generated in accord with known information concerning the runway for comparison with the runway actually displayed by the perspective radar.

The manner in which this runway generating operation is carried out will be understood by referring to the diagramatic view of the runway in the upper portion of FIG. 6. First, it must be assumed that the physical characteristics of the runway are known in advance. In other words, the present system to be described depends on the fact that the pilot knows in advance the physical dimensions of the runway. Normally, this information is provided on navigation charts or in manuals.

Thus, assuming the length of the runway is L and the width of the runway is W as shown in FIG. 6, a pair of line segments corresponding in length to the distance between the threshold corners 61 and 62 and the end of the runway corners 63 and 64 can be generated and displayed on the display screen 15, the seperation distance between the lines corresponding on the perspective view to the length L of the runway. Further, knowing the range R1 from the final fix point to the end of the runway and the range R2 from the final fix point to the threshold of the runway, the length L of the runway being equal to R1-R2, the proper vertical location of the two horizontal lines designating the threshold and end of the runway can be provided on the display 15.

Finally, the width of the runway fixes a given angle $\phi 1$ subtended by the aircraft 12 from the far corners 63 and 64 of the runway. Similarly, an angle $\phi 2$ is subtended at the aircraft by the near corners 61 and 62. Since the two angles $\phi 1$, $\phi 2$ are thus determined by the width of the runway, this information can be inserted into the display 15 to position the generated runway in a proper horizontal location.

Referring now to the lower portion of FIG. 6, the various circuits for accomplishing the generation of the runway outline will be described. Initially, a ramp volt generator and one shot multi-vibrator 65 receives a synchronizing trigger signal from the trigger signal generator 17 and a delay to the square pulse generated corresponding to the range R2 is set into the circuit as by the potentiameter shown.

The output from the circuit 65 passes into a delay circuit 66 provided with a potentiometer control which provides for a delay corresponding in range to the length L of the runway. The output of delay 66 is a pulse which is passed together with the first pulse from the circuit 65 by way of lead 67 to a two pulse output from which the pulses pass to a coincidence circuit 68 and thence to the video input of the display 15.

The two pulses described provide for the two horizontal lines indicating the threshold and end of the runway. These lines must be converted into line segments which will properly display the threshold and end of the runway in perspective and towards this end, signals determined by the angles $\phi 1$ and $\phi 2$ are utilized to gate the coincidence circuit 68 at proper moments in time to provide for the line segments.

This gating is accomplished by a gate 69 feeding a gating signal into the coincidence circuit 68. The proper timing of the gate is controlled by input signals corresponding to $\phi 1$ and $\phi 2$ provided by a block 70 passing to the position sensor 29. When the position sensor senses an azimuth position of the fan shaped beam at an angle to the left and right of center corresponding to $\phi 1/2$ and $\phi 2/2$, the gate 69 operates the coincident circuit 68 to pass the two generated pulses and thus generate the line segments.

The outline of the runway generated by the mechanism described is illustrated as 11' on the display 15. For purposes of illustration, the actual perspective display of the runway 11 is shown off center indicating an error. Since the generated runway 11' denotes the precise correct position of the runway in accord with the known input information at the final fix, the pilot knows he must maneuver the airplane to cause the perspective display of the runway 11 to coincide with the generated runway outline 11'. Thus the pilot must change his bearing slightly to the right and also increase his elevation by a slight amount to bring the threshold T in alignment with the threshold T'.

By also feeding into the appropriate box the estimated ground speed, the range R2 can be automatically diminished to adjust the block 65 as the aircraft approaches the runway and similarly, the angles $\phi 1$ and $\phi 2$ will vary in a known manner as the range R2 decreases. Accordingly, the generated outline of the runway will automatically change; that is, enlarge in a horizontal direction and exhibit a greater perspective as the aircraft descends along it's selected glide path. However, these changes degrade in accuracy with increasing distance from the final fix. As in the case of the vector 50 of FIGS. 4 and 5, the generated outline is primarily useful in precisely locating the runway on the perspective radar screen at the final fix point.

Figure 7:
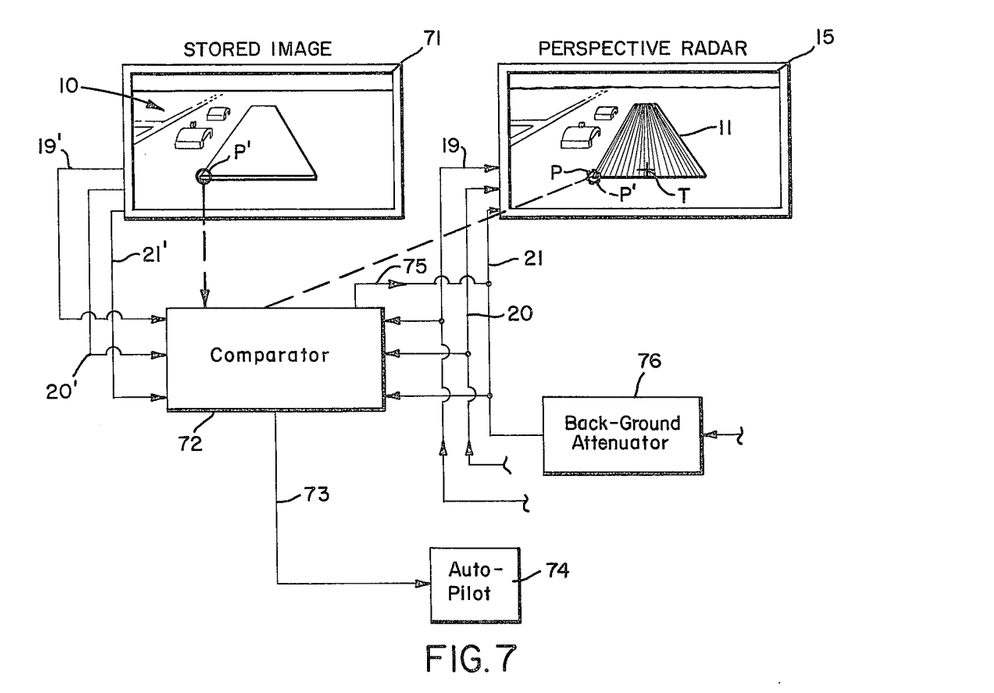
FIG. 7 is a simplified block diagram illustrating techniques for comparing a stored image of known airport complex characteristics with the perspective radar display thereby enabling automatic control of the aircraft during approach and landing by the aircraft auto-pilot.

FIG. 7 illustrates a system which will not only aid the pilot in locating the runway but will continue to provide information for a precision approach and landing of the aircraft. In FIG. 7, rather than generating an outline of the runway on the perspective as an additional display, an actual image of the entire airport complex may be provided for comparison with the perspective radar picture.

Such an image storing means is indicated schematically at 71 wherein the stored image of the airport complex 10 may be provided from photographs or detailed charts of the airport complex. Such a photograph or chart can be scanned by a raster pattern set up identically to the type of raster pattern utilized in the perspective radar so that there are provided vertical, horizontal, and video signals on lines 19', 20' and 21' to a comparator 72. Comparator 72 will directly compare the signals with the corresponding vertical, horizontal, and video input signals passed to the perspective radar, the horizontal and vertical input signals assuring proper synchronism. Errors or mismatching of the video signals in the comparator will then give rise to output signals on the line 73 which can be used to alert the pilot of a mismatching or alternatively of a proper matching of the stored image with the actual perspective radar picture.

Essentially, the forgoing signal would be generated at the last fix point under Air Traffic Control and would be in the form of a go or no-go signal.

Much if not all of the United States has been radar photographed in map form at much the same frequency and resolution that the perspective radar provides. NASA has much of this radar mapping of the United States on file, such as N70-38887 which is for California. Also, interpretation of aerial radar photographs is available from NASA in map form which would be useful in setting up a computer logic for the storage image means 71 of FIG. 7.

Radar map matching has been successfully used for guidance along a predetermined track as has also optical tracking and map matching for guidance. Image correlation with stars has also been reported by NASA in report N70-25914 (image processing page 50–952) and pattern recognition by the Department of Defense, AD-703859.

In addition, there is a book entitled "Computer Techniques In Image Processing" by Harry C. Andrews, Academic Press, 1970 and another book entitled "Computer Oriented Approaches to Pattern Recognition" by William S. Meisel, Academic Press, 1972. U.S. Pat. No. 2,964,642 discloses methods and apparatus for correlating corresponding points into images together with plus and minus alignment error signals. An important technique for understanding the subject concept is utilized by Micro-Magnetic Inc. of Palo Alto, Calif. to achieve a $1.00 bill changer which is covered by several patents such as U.S. Pat. No. 3,256,968.

It will be evident from the forgoing that the technology is known to effect a proper image matching in much the same way as the $1.00 bill changer provides a go or no-go signal depending upon whether the inserted dollar bill matches the stored image computer information.

The system of FIG. 7, however, can be further advanced by storing a succession of images rather than a single image as described above. With this arrangement, output signals would continuously be supplied as the aircraft approaches the runway indicating whether the aircraft is on it's proper glide path and these signals on the line 73 of FIG. 7 may be passed directly to the aircraft auto-pilot 74 to automatically manuever the aircraft in a manner to maintain a proper matching between the perspective radar and the succession of stored images.

One simple means for providing the above type of stored image information would be to record on a magnetic tape the signals in a perspective radar which occur when an aircraft is flown down a correct glide path to the airport, such flight being carried out on a sunny day when good visibility obtains. The stored magnetic tape signals can then be used for comparison with perspective radar signals provided on subsequent approaches and landings wherein the weather is poor. Clearly, proper matching of the stored images with the actual perspective radar will assure that the aircraft is traveling along the same glide path as was done when the magnetic tape was first generated on a clear day.

It will be understood that under the above circumstances, the tracking is extremely accurate there being a very large number of points in the corresponding pictures which "lock on" to each other. In fact, in the case of a previously prepared magnetic tape having the entire perspective radar picture stored, essentially the entire image of the perspective radar is locked onto the entire image in the stored tape.

In the forgoing illustration, the comparison of the images would be initiated at the last fix point under Air Traffic Control and at this point in time, a "hands-off" situation would obtain wherein complete automatic control by the auto-pilot would take over.

In the simpler forms of aiding the pilot in airport recognition described in FIG. 4 by using a vector or in FIG. 6 by using the outline generator or as in the simplified version of FIG. 7 where only a single stored image is compared with the perspective radar to provide a go or a no-go signal, the pilot may select a suitable lock-on point for aiding the guiding of the aircraft after leaving the last fix under Air Traffic Control. For example, such a lock-on point would be prominent radar echo return object such as might exist at the corner or edge of the runway itself or possibly from the runway lights. In FIG. 7, a selected lock-on point is shown at P' at the corner of the runway, this lock-on point corresponding to the corner P of the perspective radar runway 11. Well known circuitry for effecting "edge tracking" would be utilized to provide output signals from the comparator for any mismatching of the lock-on point P' and P at the last fix point under Air Traffic Control.

The pilot himself may monitor the lock-on point by regenerating on the perspective radar in a superpositioned manner, the lock-on object selected such as the corner of the runway. This regeneration or feedback is provided by the feed-back line 75 from the comparator to the video input 21 and as indicated by the dashed lines, the lock-on point P' in the stored image is regenerated on the perspective radar screen so that the pilot may monitor it's correspondence with the lock-on point of the generated perspective display.

In the case of continuous image matching as the aircraft approaches and lands as described heretofore, there is in effect a locking on of all points in both images all the way through to a landing. In the simpler case wherein only a single stored image is compared with the perspective radar at the last fix under Air Traffic Control, the pilot may still lock-on to a point shown on the perspective radar, a simple circuit connected to the automatic pilot maintaining the aircraft at a proper elevation and bearing to hold the selected lock-on point at a consistent position relative to a reticle or other reference mark on the radar screen. The situation here is analogous to automatic optical tracking to rotate and elevate a gun or a television camera using photocells except in the present case, the perspective radar signals are used to control the elevation and bearing of the aircraft.

Where the lock-on point is displaced from the touch down point on the runway, an automatic bias or correction corresponding to the displacement would be provided so that the aircraft would be automatically guided to the proper touch down point rather than towards the locked on object.

To provide for greater contrast in defining a lock-on point such as the edge of the runway, a background attenuator 76 may be interposed in the video signal line 21 to essentially attenuate background signals picked up by the perspective radar and thus emphasized the runway outline in the event the edge of the runway is used as a lock-on point.

Figure 8:
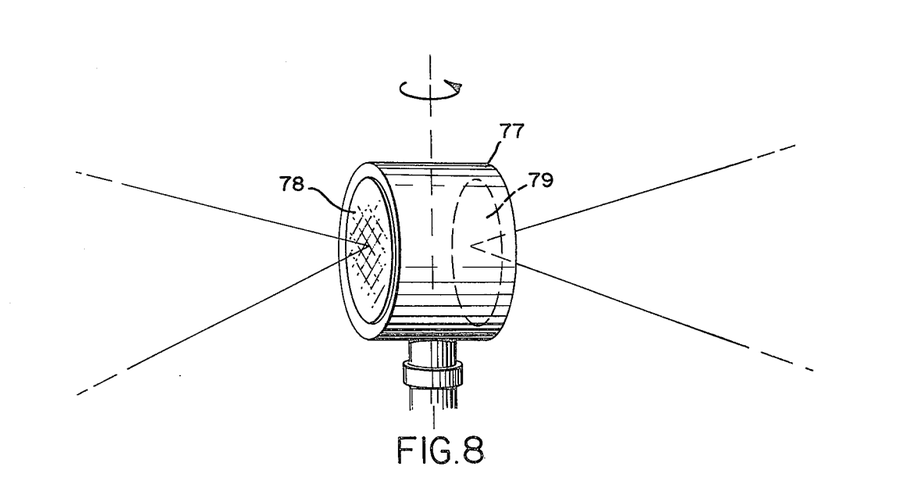
FIG. 8 illustrates a rotating beacon light as an example of a tracking or "lock-on" point which may be utilized in accord with the various embodiments of the invention.

Referring to FIG. 8, there is shown a rotating beacon light 77 normally constituting part of an airport complex. By providing the light emitting surfaces such as the glass lens 78 and 79 with a light transparent film constituting a good reflector of radar energy, the beacon itself becomes an excellent lock-on point in tracking. Since the beacon is rotating, the radar signal appearing on the display screen would fluctuate in brightness and would be easily identifiable.

The showing in FIG. 8 is merely set forth to illustrate that equipment already existing at airports can advantageously be used in providing proper lock-on points for guidance.

From the foregoing description, it will be evident that the present invention has contemplated several embodiments which greatly increase the precision with which approaches and landings can be made. These advantages should greatly reduce the required minimums now established by the FAA at many airports as well as greatly increase the safety in approach and landing operations.

What is claimed is:

1. An airport recognition and landing guidance system for use in an aircraft as a completely self-contained system within the aircraft operative independently of any landing signals emanating from the airport or other ground areas after a standard FAA Air Traffic Control final fix is established, comprising, in combination:
   a. a radar system including a PRF synchronizing trigger signal generator and antenna means, said radar system generating vertical, horizontal, and video radar signals for providing a basic perspective display of actual, not stylized terrain in front of the aircraft when viewed on a display screen; and
   b. guidance control means incorporating known information relative to an airport complex for comparison with the perspective radar information in said radar signals of actual terrain.

2. A system according to claim 1, including a cathode ray display screen having vertical, horizontal and video inputs connected to receive said radar signals respectively to provide a perspective display of the actual terrain, and in which said guidance control means includes:
   a. first means receiving trigger signals from said trigger signal generator and providing first output signals to said video input of said display in addition to video signals from said antenna means;
   b. second means providing horizontal position second output signals to said video input of said display; and
   c. control means connected to said first and second means to control the points in time in which the signals are applied to said video input in accordance with said known information whereby an additional display is generated on said display screen by said first and second signals enabling the pilot to quickly locate the airport complex on the display screen.

3. A system according to claim 2, including means defining horizontal lines vertically spaced on the display screen indicating in degrees the depression angle to the perspective display of actual terrain generated by the radar signals which become glide slopes that can be followed by the aircraft if the terrain contains an airport and an approach for landing is attempted; and means defining a single vertical line bisecting the screen and defining a zero degree bearing, there being provided a scale in degrees horizontally extending to the right and left of said vertical line below said screen indicating bearing deviations.

4. A system according to claim 2, in which said known information includes the range and heading of the aircraft to the airport complex from a given fix point of the aircraft, said screen including a bearing scale, and in which said first means and control means include delay means receiving a trigger signal from said trigger signal generator and providing said first output signals to said video input of said display; and means responsive to the estimated range to the airport complex and the estimated ground speed of the aircraft at said given fix point connected to said delay means to vary the points in time that said first output signals are applied to said video input; and said second means and said control means including means responsive to the magnetic heading of said aircraft at said given fix point connected to the horizontal input and including gate means connected to the video input such that said additional display comprises a vertical vector on said display screen the length of which decreases with decreasing range to said airport complex and the horizontal position of which is determined by said magnetic heading, whereby the pilot may quickly locate the airport complex on the radar screen by observing the end point of said vertical vector and may also be advised of any heading deviation by observing the horizontal position of said vector relative to said bearing scale.

5. A system according to claim 1, including a cathode ray display screen having vertical, horizontal and video inputs connected to receive said radar signals respectively to provide a perspective display of the actual terrain, and in which said guidance control means includes first and second delay pulse generators responsive to trigger signals from said trigger signal generator to provide two pulses in response to each trigger pulse delayed in time to said video input, thereby generating a pair of spaced parallel horizontal lines on said radar display screen for comparison with the perspective display, the time interval between the pulses representing a given distance in elevation as determined from said known information whereby the pilot may determine if his approach along a glide slope intercepting the airport runway threshold is within the elevation distance defined by the pair of horizontal lines, the pilot knowing that if the glide slope is straddled by the lines, the approach progress is correct.

6. A system according to claim 2, in which said first and second means and control means comprise a runway outline generating means, the runway outline defining said additional display, said generating means including a pulse generator providing two pulses defining said first signals, said pulses being seperated in time to indicate a perspective distance on said display corresponding to the known length of the airport runway, the vertical position of the pulses being determined initially by the known range of the airport runway; and means responsive to the azimuth angles of the corners of the threshold and termination lines of the runway providing the second signals to the video input of the display screen to generate on the display screen a perspective outline of the runway as it would appear at said given fix point for comparison with the perspective radar display actually detected, whereby the pilot is aided in recognizing the airport runway by comparing the generated runway outline and the actual perspective radar display of the runway.

7. A system according to claim 1, in which said guidance control means includes image storing means defining physical characteristics of said airport complex; a comparator circuit; means connecting said image storing means to one side of said comparator and perspective radar signals to the other side of said comparator; and means connected to said comparator for generating control output signals indicative of a proper matching between at least one characteristic of the stored airport complex image information and the actual information detected by said perspective radar.

8. A system according to claim 7, in which said output signals are connected to an auto-pilot for automatic landing control of said aircraft by proper matching of said stored image with the perspective radar signals.

9. A system according to claim 8, including background attenuating means connected into said perspective radar system for modifying the perspective radar signals to enhance the pertinent features corresponding to the pertinent features in said airport complex image information.

10. A system according to claim 7, in which said one characteristic of the stored airport complex image comprises a rotating beacon light having light emitting surfaces highly reflective of the radar radiation emitted by said antenna means.

* * * * *